United States Patent
Bauer (10) Patent No.: US 7,009,145 B2
(45) Date of Patent: *Mar. 7, 2006

(54) WELDING SYSTEM HAVING WELDING GUN WITH SELF-CONTAINED LOCKING TRIGGER

(75) Inventor: Gregory W. Bauer, Wilmington, IL (US)

(73) Assignee: Illinois Tool Works Inc., Glenview, IL (US)

( * ) Notice: Subject to any disclaimer, the term of this patent is extended or adjusted under 35 U.S.C. 154(b) by 137 days.

This patent is subject to a terminal disclaimer.

(21) Appl. No.: 10/210,638

(22) Filed: Jul. 31, 2002

(65) Prior Publication Data

US 2004/0020909 A1 Feb. 5, 2004

(51) Int. Cl.
*B23K 9/00* (2006.01)
*H01H 9/20* (2006.01)

(52) U.S. Cl. .............................. 219/137.31; 200/43.17
(58) Field of Classification Search .......... 219/137.31, 219/137.42, 137.62, 137.63; 200/43.17
See application file for complete search history.

(56) References Cited

U.S. PATENT DOCUMENTS

| | | | | |
|---|---|---|---|---|
| 3,576,423 A | * | 4/1971 | Bernard et al. | 219/136 |
| 3,629,547 A | * | 12/1971 | Kester et al. | 219/120 |
| 4,250,366 A | * | 2/1981 | Erickson et al. | 200/332.2 |
| 4,731,518 A | * | 3/1988 | Parmelee et al. | 219/137.31 |
| 5,698,122 A | * | 12/1997 | Lubieniecki et al. | 219/137.31 |
| 6,025,574 A | * | 2/2000 | Colangelo, Jr. | 219/137.31 |
| 2003/0015510 A1 | * | 1/2003 | Wakeman | |
| 2003/0080102 A1 | * | 5/2003 | Wakeman | |
| 2003/0127443 A1 | * | 7/2003 | Doherty | |

* cited by examiner

*Primary Examiner*—Kevin P. Kerns
(74) *Attorney, Agent, or Firm*—Fletcher Yoder (57) ABSTRACT

A welding system having a welding gun with a self-contained trigger and trigger locking assembly. The self-contained trigger and trigger locking assembly has a trigger that is pivoted to operate the power source. The self-contained trigger and trigger locking assembly has a movable stem that pivots with the trigger and a stem receiving portion that is operable to receive the stem. The stem receiving portion acts to restrict pivotal movement of the stem so to maintain the trigger pivoted in position to continue operation of the power source.

33 Claims, 6 Drawing Sheets

WELDING SYSTEM HAVING WELDING GUN WITH SELF-CONTAINED LOCKING TRIGGER

FIELD OF THE INVENTION

The present invention relates generally to welding systems, and particularly to a welding system having a welding gun coupled to a source of electric power.

BACKGROUND OF THE INVENTION

Welding is a method of joining pieces of metal together into one solid piece. Welding guns are used in a number of different types of welding. For example, welding guns are typically used in arc welding. An arc welding system typically comprises an electric power supply coupled to a welding gun that houses an electrode. The electric power supply typically includes a conductive cable and a clamp for securing the conductive cable to the metal piece to be welded. The electrode in the welding handle, along with the metal piece and conductive cable, completes an electrical circuit with the power supply when the electrode is placed against the metal piece. The contact between the electrode and the metal piece produces an electric arc between the electrode and the metal piece. The heat of the electric arc is concentrated on the metal piece, or pieces, to be joined. The heat of the arc melts the metal piece, or pieces. A filler material is added to the molten metal. The molten mass then cools and solidifies, joining the metal pieces.

MIG (Metal Inert Gas) welding is one type of arc welding. MIG welding is also referred to as "wire-feed" or GMAW (Gas Metal Arc Welding). In MIG welding, a metal wire is used as the electrode to produce the arc. The wire is shielded by an inert gas and the metal wire acts as the filler for the weld. The inert gas is used to shield the electric arc from outside contaminants and gases that may react with the weld. Non-inert gases, such as $CO_2$, also are used in MIG welding. Typically, the wire and gas are fed through a hand-held welding gun. The wire and gas are fed to the welding gun from a welding system having a wire feeder, a power source, and a source of gas, such as a gas cylinder. The welding gun, typically, has a switch, or trigger, that is coupled to the rest of the system. When the trigger is operated, gas and wire are fed through the handle and power is applied to the wire. Typically, triggers have a spring that is used to bias the trigger to a disengaged position. The force of the spring must be overcome to operate the trigger.

Submerged arc welding is another type of arc welding method. In submerged arc welding, a wire feeder also is used to feed electrode wire through a welding gun. However, in submerged arc welding, a granular flux, rather than a gas, is used. In submerged arc welding, the point of metal fusion and the arc are submerged within the flux. The flux is a granular composition of chemical and metallic materials that shields the arc. The granular flux is continuously deposited by the welding gun just ahead of the electrode. The electrical current melts the electrode to form the weld puddle. The portion of the flux that is adjacent to the electrode tip and the puddle melts, forming a slag layer that refines the weld and excludes air. The wire and flux also are fed through a welding gun. The welding handle for a submerged arc welding system also, typically, has a switch, or trigger, that is coupled to a welding system. When the trigger is operated, the flux and the wire are fed through the welding gun and power is applied to the wire.

Trigger locks have been developed to maintain a trigger in an engaged position so that a user does not have to squeeze the trigger against spring force for an extended period of time. Currently, triggers and trigger locks are composed of numerous pieces that are adapted to cooperate with portions of the welding handle. For example, a typical trigger is used to operate a switch that is electrically coupled to the other components of the system, such as the power source. The switch is fixed in place in the handle and the trigger is fixed to the handle so that it can pivot relative to the handle to operate the switch. A typical trigger lock may have a stem, such as a pin, that extends through the trigger into a portion of the handle to maintain the trigger pivoted.

Assembling the trigger and trigger lock pieces together with the handle may be time-consuming. For example, to assemble the welding gun, the trigger and stem must be positioned in the welding handle so that the locking stem will be able to align with the hole in the welding handle. In addition, supplies of each of the parts must be maintained at the assembly area during assembly. Additionally, all of the parts must be tracked during disassembly to prevent a part from being lost. Additionally, the more the various individual pieces are required to cooperate, the greater the possibility of failure of the trigger and trigger lock.

There exists then a need for a welding system that utilizes a welding gun having fewer pieces for assembly. Additionally, there is a need for a trigger and trigger lock that has all of the components contained in a single device and which does not need to cooperate with portions of a welding handle to lock the trigger in a desired position.

SUMMARY OF THE INVENTION

The present technique provides a novel welding system designed to respond to such needs. According to one aspect of the present technique, a welding system is featured. The welding system has an electrical power source and a welding gun with a self-contained trigger and trigger locking assembly. The self-contained trigger and trigger locking assembly has a trigger that is operated to control the power source. The trigger may be operated to control the application of power to electrode wire extending from the power source and to control the feeding of the electrode wire from a wire feeder. The trigger may also be operable to control the supply of a gas, flux, or other substance.

The self-contained trigger and trigger locking assembly is operable to lock the trigger in a desired position so that a user does not have to hold the trigger continuously, yet may maintain the power source operating to supply power and feed electrode wire. The self-contained trigger and trigger locking assembly may have a movable stem that pivots with the trigger and a stem receiving portion that is operable to receive the stem. The stem receiving portion may act to restrict pivotal movement of the stem so to maintain the trigger pivoted in the desired position so that power from the power source is maintained.

According to still another aspect of the present technique, a method of operating a welding system is featured. The method may comprise the act of operating a spring-action trigger of a self-contained trigger and trigger locking assembly to initiate operation of the welding system. The method also may comprise the act of driving a stem of the self-contained trigger and trigger locking assembly into a stem receiving portion of the self-contained trigger and triggering locking assembly. The method also may comprise the act releasing the spring-action trigger to cause the stem to be driven against the stem receiving portion by the spring-action trigger, holding the stem against the stem receiving portion.

According to yet another aspect of the present invention, a method of assembling a welding gun is featured. The method may comprise the act of disposing a self-contained trigger and trigger locking assembly within a first handle piece adapted to receive the self-contained trigger and trigger locking assembly. The method also may comprises the act of securing a second handle piece adapted to receive the self-contained trigger and trigger locking assembly to the first handle piece so as to secure the self-contained trigger and trigger locking assembly to the welding gun.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
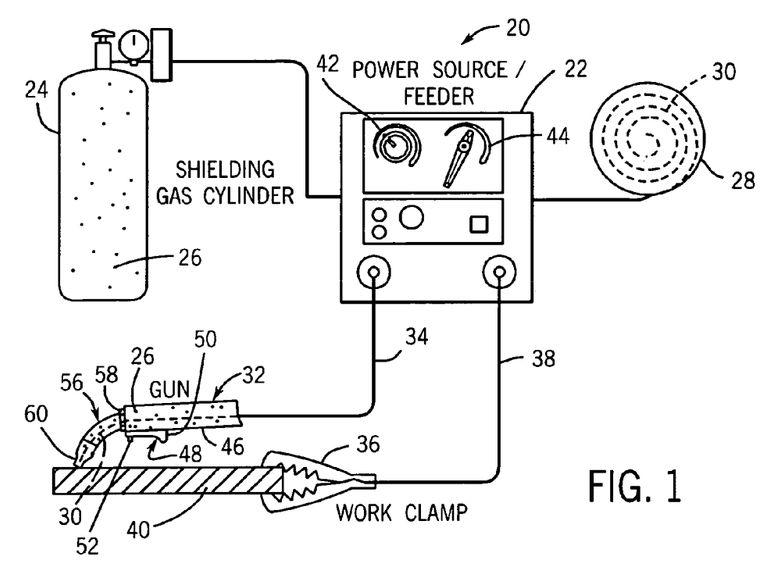
FIG. 1 is a diagram of a MIG welding system, according to an exemplary embodiment of the present technique.

Referring generally to FIG. 1, an exemplary metal inert gas ("MIG") welding system 20 is illustrated. However, the present technique is operable with other types of welding systems, such as submerged arc welding systems. The illustrated welding system 20 comprises a power source/wire feeder 22, a gas cylinder 24 containing a gas 26 that is coupled to the power source/wire feeder 22, a spool 28 of electrode wire 30 that is coupled to the power source/wire feeder, a welding gun 32, a welding cable 34, a work clamp 36, and a ground cable 38. The power source/wire feeder 22 provides electric power to the welding gun 32 via the welding cable 34. Additionally, the power source/wire feeder 22 directs the feeding of gas 26 and wire 30 to the welding cable 34. The welding cable 34 is operable to route the gas 26 and the wire 30 to the welding gun 32. The work clamp 36 is clamped onto the conductive workpiece 40 to be welded. The work clamp 36 and a ground cable 38 electrically couple the power source/wire feeder 22 to a workpiece 40. Additionally, the wire 30 within the welding cable 34 is electrically coupled to the power source/wire feeder 22.

The welding gun 32 is used to direct the wire to the workpiece 40 and to control the supply of gas 26 and wire from the power source/wire feeder 22 to the workpiece 40. When the wire is touched to the workpiece 40, the electrical circuit is completed. Electricity from the power source/wire feeder 22 flows through the wire 30 and workpiece 40, producing an arc. The electric arc produces heat that melts the workpiece 40 in a region surrounding the point of contact between the wire 30 and the workpiece 40. The wire also acts as filler material. The heat of the arc melts the wire 30 along with the workpiece 40. The inert gas 26 forms a shield that prevents harmful chemical reactions from occurring at the weld site. When the arc is removed, the workpiece 40 and the filler material solidify, forming the weld.

The power source/wire feeder 22 may have a variety of different features. For example, in the illustrated embodiment, the power source/wire feeder 22 has a wire speed control 42 to enable a user to control the speed at which wire 30 is fed from the power source/wire feeder 22. Additionally, the illustrated power source/wire feeder 22 has a variable voltage control 44 to enable a user to control the voltage produced by the power source/wire feeder 22.

Figure 2:
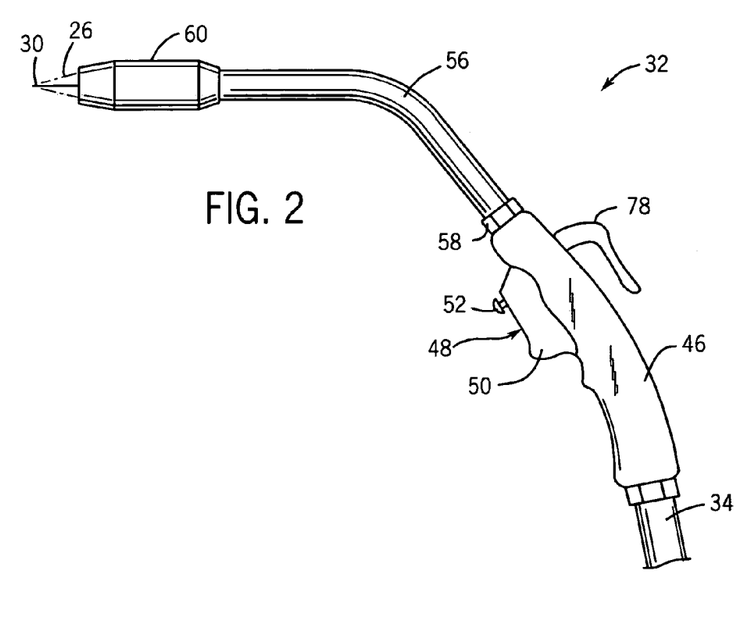
FIG. 2 is a front elevational view of a welding gun configured for use in the welding system of FIG. 1.
Figure 3:
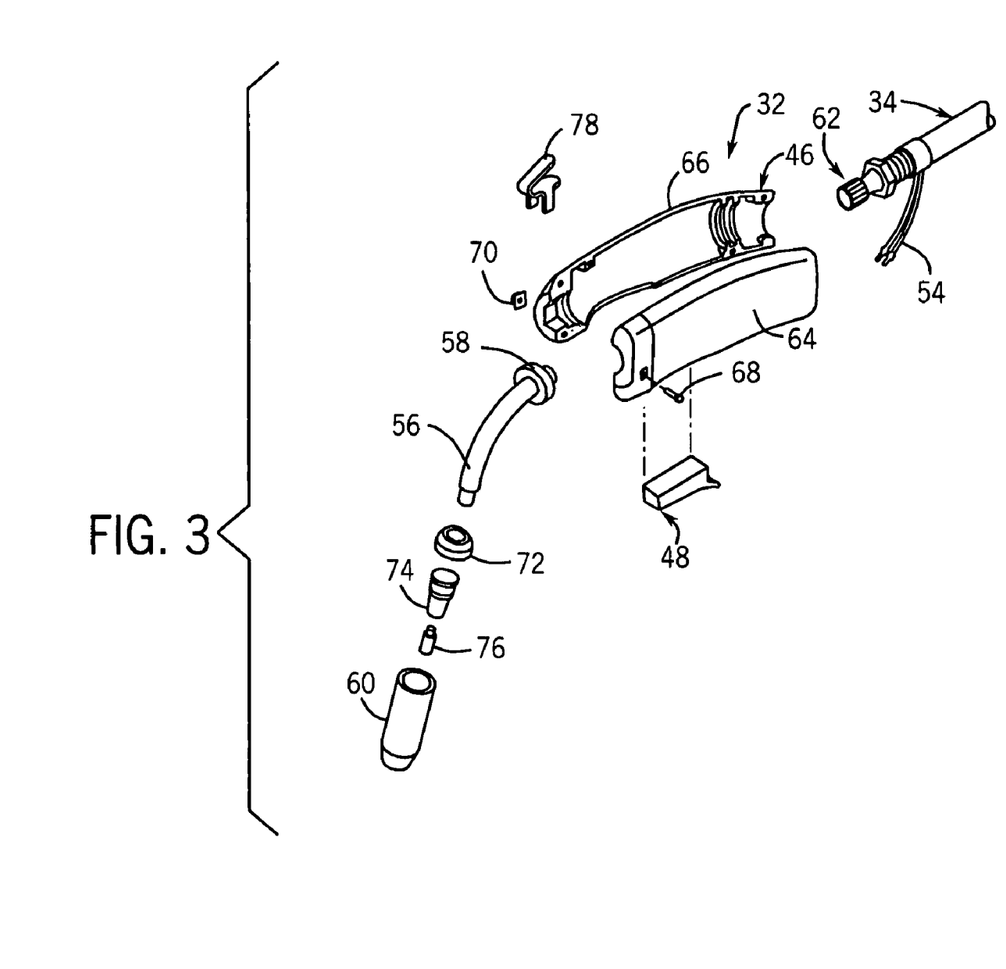
FIG. 3 is an exploded view of a welding gun configured for use in the welding system of FIG. 1.

Referring generally to FIGS. 2 and 3, the welding gun 32 comprises a handle 46 and a self-contained trigger and trigger lock assembly 48. The self-contained trigger and trigger lock assembly 48 has a trigger 50 and a trigger lock 52. As best illustrated in FIG. 3, the welding cable 34 has control wires 54 that are connected to the self-contained trigger and trigger lock assembly 48. The trigger 50 enables a user to control the supply of gas 26, wire 30 and power from the power source/wire feeder 22.

In the illustrated embodiment, the trigger 50 is operated by squeezing the trigger 50 towards the handle 46. A number of events occur when the trigger 50 is operated. One event is that an electrical signal is sent from the trigger 50 to the power source/wire feeder 22 through the control wires 54. The power source/wire feeder 22 is directed to draw in wire 30 from the wire spool 28 and feed it though the welding cable 34 to the welding gun 32. Additionally, gas 26 from the gas cylinder 24 flows through the welding cable 34 to the welding gun 32. Also, electric power from the power source/wire feeder 22 is supplied to the wire 30. When activated, the trigger lock 52 maintains the trigger 50 engaged, keeping gas 26 and wire 30 flowing. The welding gun 32 also has a neck 56. The neck 56 is secured to the welding handle 46 by a retainer nut 58. The wire 30 and gas 26 are then fed through the neck 56 towards the workpiece 40. A nozzle 60 directs the wire 30 and gas 26 from the neck 56 towards the workpiece 40. When the trigger 50 is released, gas 26, wire 30, and electrical power are no longer fed to the welding gun 32.

Referring generally to FIG. 3, the welding cable 34 has a connector assembly 62 to couple the welding cable 34 to the welding gun 32. In the illustrated embodiment, the welding handle 46 is comprised of a left handle portion 64 and a right handle portion 66. The left and right handle portions are secured to each other by a screw 68 and a nut 70. The welding handle 46 also comprises an insulator 72, a diffuser 74, and a tip 76. In the illustrated embodiment, the insulator 72, a diffuser 74, and tip 76 are housed within the nozzle 60. The tip 76 is used to direct the wire 30 towards a workpiece. The insulator 72 is used to prevent electricity in the wire 30 from flowing through the neck 56 to the welding handle 46, shocking the user. The diffuser 74 is used to establish the desired flow characteristics of the gas 26, e.g., pressure. The nozzle 60 is used to direct the gas 26 to the workpiece 40. Additionally, the illustrated welding handle 46 has a hook 78 that may be used to hang the welding gun 32 from a mounting hook.

Figure 4:
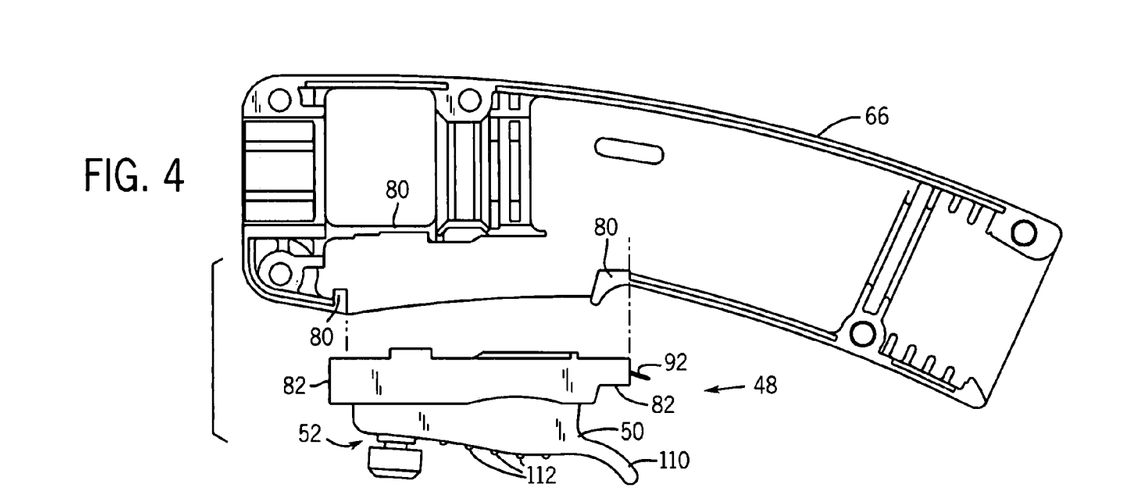
FIGS. 4 and 5 are front elevational views illustrating the installation of a self-contained trigger and trigger locking apparatus in the welding gun, according to an exemplary embodiment of the present technique.
Figure 5:
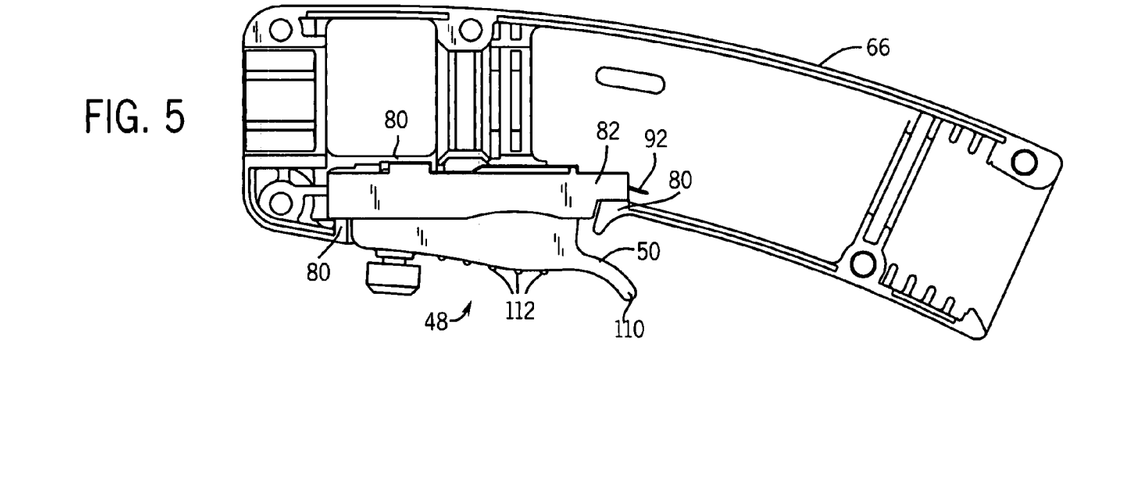

Referring generally to FIGS. 3, 4, and 5, the left and right welding handle portions are adapted to secure the self-contained trigger and trigger locking assembly 48 to the welding gun 32. As best illustrated in FIGS. 4 and 5, the right handle portion 66 has guide portions 80 that are adapted to receive the self-contained trigger and trigger locking assembly 48. The left handle portion 64 also has guide portions 80 (not shown). During assembly, the self-contained trigger and trigger locking assembly 48 is placed within the guide portions 80 of either the left or right handle portions. When the left and right handle portions are secured together, the guide portions 80 contact fixed portions 82 of the self-contained trigger and trigger locking assembly 48, securing the self-contained trigger and trigger locking assembly 48 in place within the welding gun 32.

Figure 6:
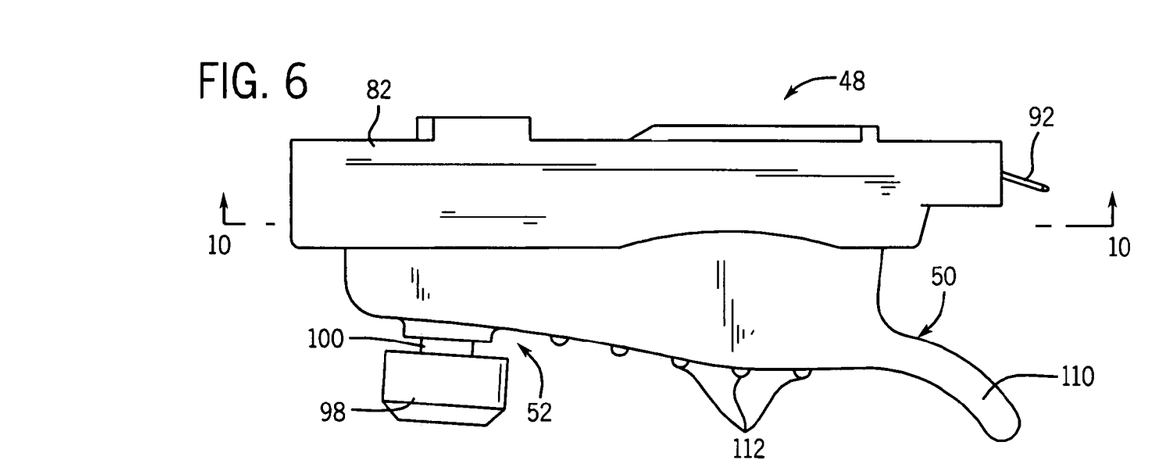
FIG. 6 is a front elevational view illustrating the trigger and trigger lock in disengaged positions.
Figure 7:
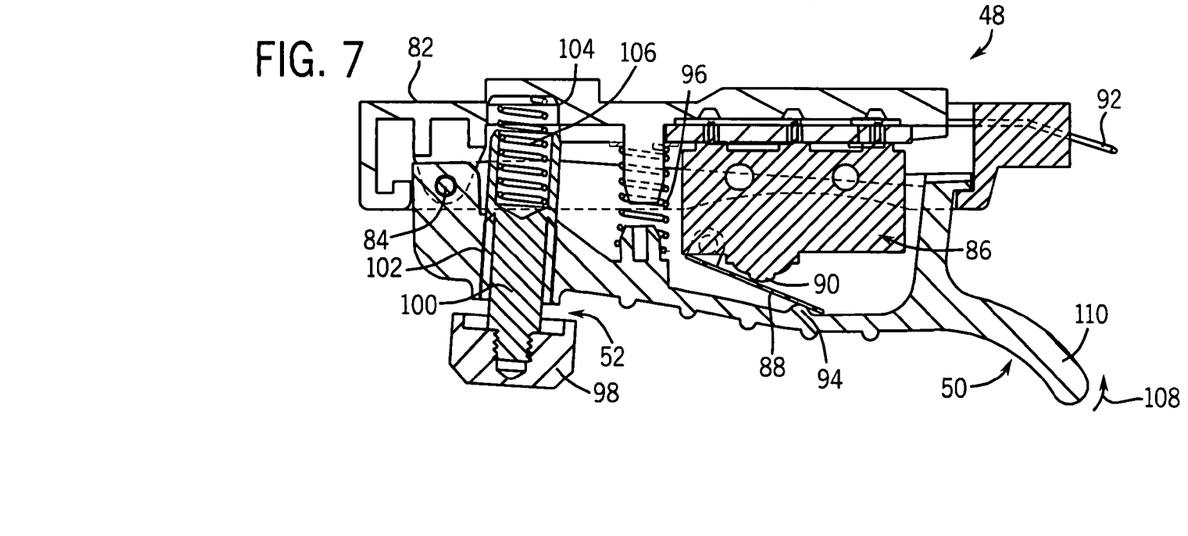
FIG. 7 is a cross-sectional view of the self-contained trigger and trigger locking apparatus of FIG. 6, taken generally alone line 7—7 of FIG. 6.

Referring generally to FIGS. 6 and 7, the self-contained trigger and trigger locking assembly 48 is illustrated with the trigger 50 in a relaxed, or disengaged, position. The trigger 50 is pivoted relative to the fixed portion 82 about a pivot point 84. The self-contained trigger and trigger locking assembly 48 houses an electrical switch 86 having a lever arm 88 and a switch button 90. The electrical switch 86 is electrically coupled to prongs 92 extending out from the self-contained trigger and trigger locking assembly 48. The control wires 54 from the welding cable are connected to the prongs 92. In the illustrated embodiment, squeezing the trigger 50 causes a portion 94 of the trigger 50 to pivot the lever arm 88 against the switch button 90. If pivoted sufficiently, the switch button 90 is activated. The electrical resistance between the prongs 92 will change when the switch button 90 is operated. For example, the switch 86 may be closed so that the resistance between the prongs 92 is approximately zero ohms, or the switch may open so that the resistance between the prongs is infinite. The change in resistance produces an electrical signal that is transmitted through the control wires 54 to the power source/wire feeder 22. A biasing spring 96 is used to bias the trigger 50 in the disengaged position.

The illustrated trigger lock 52 has an outer portion 98 that is used to engage the trigger lock 52. The outer portion 98 is connected to a locking stem 100. The locking stem 100 extends through a guide 102 in the trigger 50 towards a receiving region 104 in the fixed portion 82 of the self-contained trigger and trigger locking assembly 48. A spring 106 is used to bias the locking stem 100 away from the receiving region 104. When the trigger 50 is in the relaxed position, the stem 100 is positioned at an angle relative to the receiving region 104. As the trigger 50 is squeezed, the trigger 50 is pivoted toward the fixed portion 82, as represented by the arrow 108. As the trigger is squeezed, the stem 100 is pivoted towards alignment with the receiving region 104.

Figure 8:
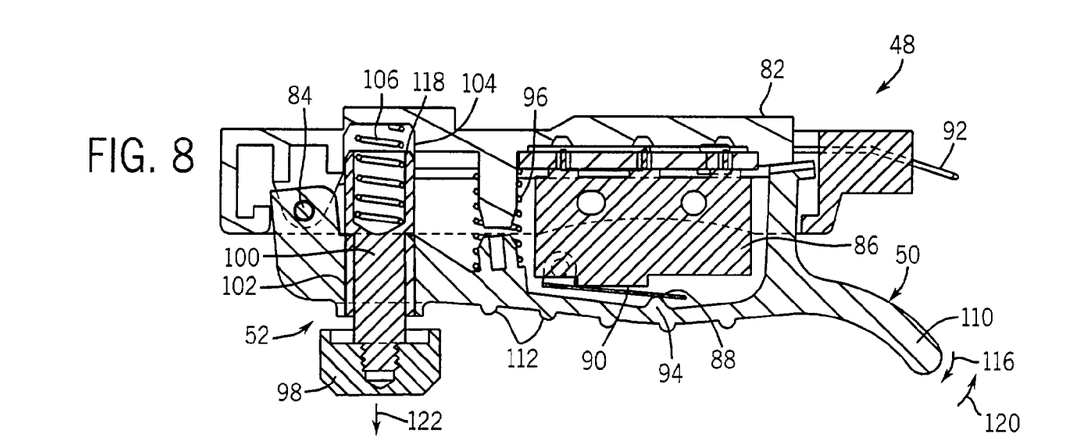
FIG. 8 is a cross-sectional view of the self-contained trigger and trigger locking apparatus, illustrating the trigger in an engaged position and the trigger lock being in a disengaged position.
Figure 9:
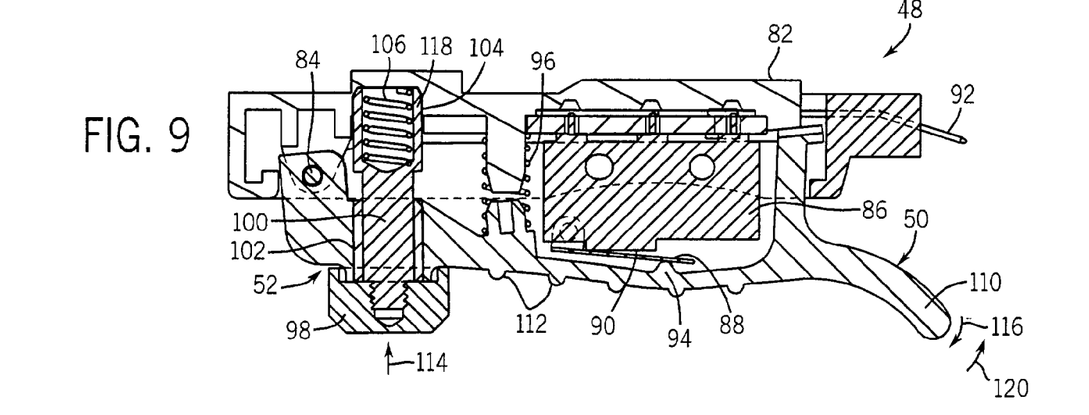
FIG. 9 is a cross-sectional view of the self-contained trigger and trigger locking apparatus, illustrating the trigger and trigger lock in an engaged positions.
Figure 10:
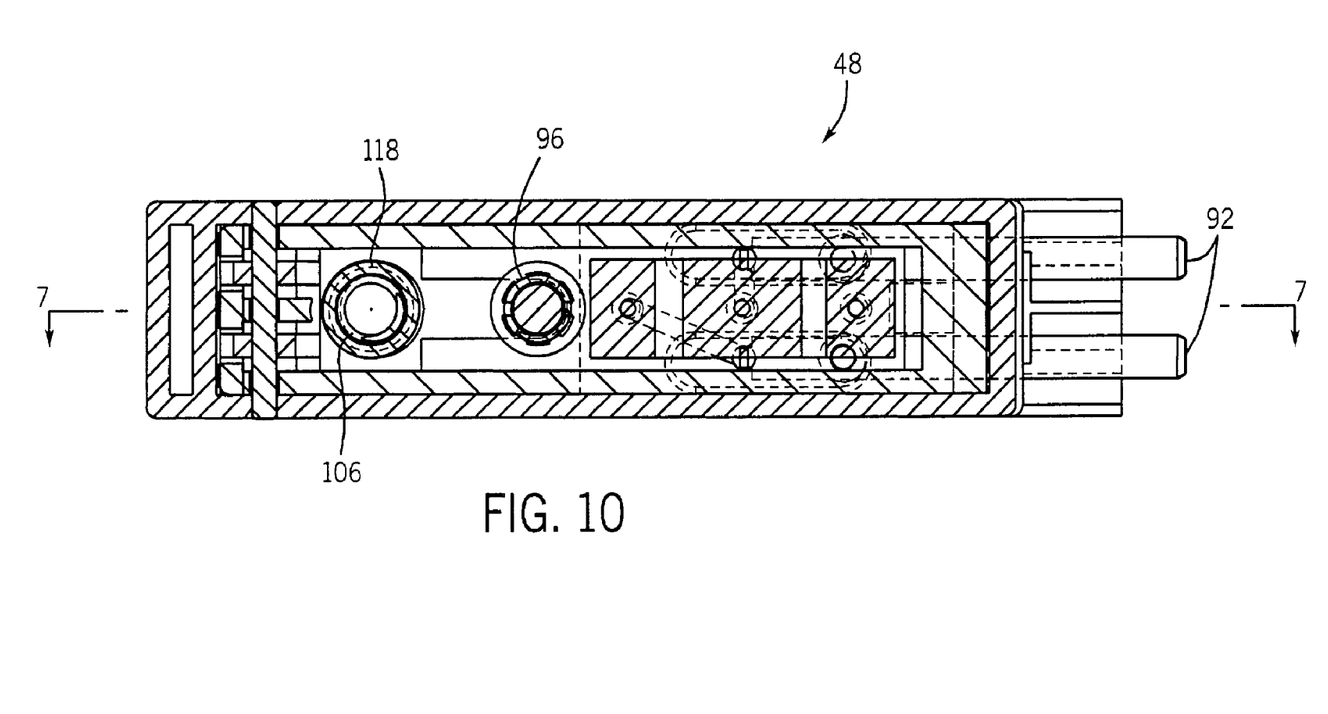
FIG. 10 is a top cross-sectional view of the self-contained trigger and trigger locking apparatus, taken generally along line 10—10 of FIG. 6.

Referring generally to FIGS. 8 and 9, the trigger 50 operates the switch button 90 when the trigger 50 is pivoted sufficiently toward the handle 46. The electrical resistance between the prongs 92 will change when the switch button 90 is activated and an electrical signal is transmitted through the control wires 54 to the power source/wire feeder 22. The illustrated embodiment of the trigger 50 has a curved portion 110 and ribs 112 to enable the trigger 50 to be gripped and operated easily.

To engage the trigger lock 52, a user drives the outer portion 98 of the trigger lock 52 inward, towards the fixed portion 82, while the stem 100 is aligned with the receiving portion 104, as represented by the arrow 114. This action drives the stem 100 into the receiving portion 104. A user may drive the outer portion 98 toward the handle 46 with a finger, such as the index finger. To lock the trigger 50 in place, the user releases the trigger 50 while holding the outer portion 98 to maintain the stem 100 in the receiving portion 104. The biasing spring 96 will attempt to pivot the trigger 50 away from the fixed portion 82, as represented by the arrow 116. However, the trigger 50 will be pivoted only a slight amount before the sides 118 of the stem 100 contact the receiving portion 104, preventing further pivoting of the trigger 50 and maintaining the trigger 50 engaged. The friction produced between the sides 118 of the stem and the receiving portion 104 prevent the spring 106 from driving the stem 100 out of the receiving portion 104

To disengage the trigger lock 52, the trigger 50 is again squeezed towards the fixed portion 82, as represented by the arrow 120. This realigns the stem 100 and receiving portion 104 so that the stem 100 is not driven against the sides 118, reducing the friction between the stem 100 and receiving portion 104. To disengage the trigger lock 52, a user does not place a finger, or other obstruction to movement, over the outer portion 98 of the trigger lock. This allows the spring 106 to drive the stem 100 outward, as represented by the arrow 122, disengaging the trigger lock 52. A user may continue operation of the welding system 20 by continuing to squeeze the trigger or a user may release the trigger 50 to discontinue operation of the welding system 20.

It will be understood that the foregoing description is of preferred exemplary embodiments of this invention, and that the invention is not limited to the specific forms shown. For example, the self-contained trigger and trigger locking assembly may be used in a variety of different welding systems. Additionally, the trigger may be shaped in a variety of different shapes. Furthermore, the trigger may be used to make or break an electrical connection between the prongs of the self-contained trigger and trigger locking assembly. These and other modifications may be made in the design and arrangement of the elements without departing from the scope of the invention as expressed in the appended claims.

What is claimed is:

1. An arc welding system, comprising:
   an electric power source; and
   a welding gun electrically coupleable to the power source, comprising:
      handle; and
      self-contained trigger and trigger lock defining a substantially enclosed volume and secured to the handle, comprising:
         a trigger operable to control operation of the electric power source;
         a fixed portion that is secured to the handle; and
         a trigger lock operable to engage the fixed portion to maintain the trigger in a desired position.

2. The system as recited in claim 1, wherein the handle comprises a plurality of handle pieces that are assembled together to form the handle, wherein the plurality of handle pieces and the fixed portion of the self-contained trigger and trigger lock are adapted such that the plurality of handle pieces capture the fixed portion when the handle is assembled together.

3. The system as recited in claim 1, wherein the trigger lock comprises a movable stem that pivots with the trigger, wherein the fixed portion is adapted with a stem receiving portion that blocks pivotal movement of the stem when disposed therein.

4. The system as recited in claim 3, comprising a spring biased to drive the stem against the stem receiving portion, wherein friction between the stem and the stem receiving portion maintains the stem within the stem receiving portion.

5. The system as recited in claim 3, wherein the stem receiving portion comprises a recess in the fixed portion.

6. The system as recited in claim 1, comprising an electrical switch that is secured to the fixed portion and operated by pivotal movement of the trigger.

7. A welding system, comprising:
   an integral trigger and trigger-locking assembly defining a substantially enclosed volume, comprising:
      first portion securable to a welding handle; and
      trigger lock that engages the first portion to maintain the trigger in a desired position.

8. The system as recited in claim 7, wherein the trigger lock comprises a movable stem and a stem receiving portion of the first portion, wherein the stem pivots with the trigger and is aligned with the stem receiving portion when the trigger is pivoted to a first pivoted position, wherein the stem may be inserted into the stem receiving portion to restrict movement of the trigger.

9. The system as recited in claim 8, comprising a first spring to bias the trigger relative to the first portion, wherein the first spring is biased to drive the stem against the stem receiving portion when the stem is inserted into the stem receiving portion.

10. The system as recited in claim 8, comprising a second spring to bias the stem out of the stem receiving portion, wherein the second spring drives the stem out of the stem receiving portion when the trigger is pivoted to realign the stem to the first pivoted position.

11. A welding gun, comprising:
    a self-contained trigger and trigger-locking assembly including a housing having top, bottom, front, back, left and right surfaces that cooperate to define a volume, and operable to be electrically coupled to a power source, comprising:
       pivotable trigger that is operable to control the power source; and
       trigger-locking assembly that is operable to engage a portion of the self-contained trigger and trigger-locking assembly to secure the trigger in a desired pivoted position to maintain the power source in a desired state of operation.

12. The welding gun as recited in claim 11, wherein the trigger-locking assembly comprises:
    a movable stem that pivots with the trigger;
    a stem receiving portion that is operable to receive the stem and restrict movement of the stem; and
    a trigger spring biased to drive the stem against the stem receiving portion, when the stem is received within the stem receiving portion.

13. The welding gun as recited in claim 12, wherein the stem receiving portion is a recess in a fixed portion of the self-contained trigger and trigger-locking assembly.

14. The welding gun as recited in claim 11, wherein the self-contained trigger and trigger-locking assembly comprises:
    an electrical switch that is operated by the trigger; and
    an electrical connector operable to electrically couple the electrical switch to a control cable electrically coupleable to the power source.

15. The welding gun as recited in claim 11, wherein welding gun comprises a plurality of handle pieces that are assembled together to form the welding gun, wherein the plurality of handle pieces and a fixed portion of the self-contained trigger and trigger-locking assembly are adapted such that the plurality of handle pieces capture the self-contained trigger and trigger-locking assembly when the handle is assembled.

16. The welding gun as recited in claim 11, wherein the welding gun is coupleable to a welding cable adapted to convey electrode wire from a wire feeder, wherein the trigger also controls electrode wire flow from the wire feeder.

17. The welding gun as recited in claim 16, wherein the welding cable is adapted to convey gas from a supply of gas, wherein the trigger also controls gas flow from the supply of gas.

18. A welding gun electrically coupleable to a power source and a wire feeder, comprising:
    a welding handle; and
    an integral trigger and trigger-locking assembly defining a substantially enclosed volume secured to the welding handle, comprising:
       first portion that is secured to the welding handle;
       trigger that is pivotably secured to the first portion, wherein electrical power from a power source and wire from a wire feeder are controlled by trigger position relative to the first portion; and
       trigger lock that is operable to engage the first portion to maintain the trigger in a desired position.

19. The welding gun as recited in claim 18, wherein the trigger lock comprises a movable stem and a stem receiving portion of the first portion, wherein the stem pivots with the trigger and is aligned with the stem receiving portion when the trigger is pivoted to a first pivoted position, wherein the stem may be driven into the stem receiving portion to restrict movement of the trigger.

20. The welding gun as recited in claim 19, comprising a first spring to bias the trigger relative to the first portion, wherein the first spring is biased to drive the stem against the stem receiving portion when the stem is driven into the stem receiving portion.

21. The welding gun as recited in claim 20, comprising a second spring to bias the stem away from the stem receiving portion, wherein the second spring drives the stem out of the stem receiving portion when the trigger is pivoted to realign the stem to the first pivoted position.

22. The welding gun as recited in claim 18, wherein the welding gun is coupleable to a welding cable adapted to convey electrode wire from the wire feeder, wherein the welding cable comprises a control cable electrically coupleable to the self-contained trigger and triggering locking assembly to control operation of the power source and wire feeder.

23. The welding gun as recited in claim 18, wherein the trigger lock is pivotally operable within the trigger and trigger-locking assembly to hold the trigger in position.

24. A welding gun, comprising:
    a self-contained trigger and trigger-locking assembly, comprising:
       a trigger that is operated to direct a power source to supply power to the welding gun;
       a movable stem that moves with the trigger; and
       a stem receiving portion that is operable to restrict pivotal movement of the stem to lock the trigger in position to direct the power source to supply power to the welding gun.

25. The welding gun as recited in claim 24, wherein the stem is aligned with the stem receiving portion by pivoting the trigger to an aligning position, whereupon the stem may be driven into the stem receiving portion to restrict movement of the trigger.

26. The welding gun as recited in claim 24, wherein the welding gun comprises a plurality of handle pieces that are assembled together to form a handle, wherein the plurality of handle pieces and the self-contained trigger and trigger-locking assembly are adapted such that the plurality of handle pieces capture a fixed portion when the handle is formed.

27. A welding gun kit, comprising:
   a self-contained trigger and trigger-locking assembly, comprising:
      a trigger;
      an interior surface; and
      a trigger lock operable to engage the interior surface to lock the trigger in a desired position; and
   a plurality of handle pieces that are assembled together to form a handle, wherein the plurality of handle pieces are adapted to capture the self-contained trigger and trigger-locking assembly when the handle pieces are secured together.

28. The welding gun kit as recited in claim 27, wherein the self-contained trigger and trigger-locking assembly comprises an electrical switch and an electrical connector, the electrical connector being adapted to connect to a corresponding electrical connector in a welding cable.

29. A method of operating a welding system, comprising the acts of:
   operating a spring-biased trigger of a self-contained trigger and trigger-locking assembly to initiate operation of the welding system and to align a stem of the self-contained trigger and trigger-locking assembly with a stem receiving portion of the self-contained trigger and trigger-locking assembly;
   driving the stem into the stem receiving portion; and
   releasing the spring-biased trigger, wherein the stem is driven against the stem receiving portion to lock the spring-biased trigger in position to maintain operation of the welding system.

30. The method as recited in claim 29, wherein releasing comprises maintaining the stem within the stem receiving portion.

31. The method as recited in claim 30, wherein maintaining comprises using a finger to provide a force in opposition to a spring biasing the stem.

32. The method as recited in claim 29, further comprising the act of unlocking the spring-biased trigger by re-operating the spring-biased trigger to drive the stem away from the stem-receiving portion so that a biasing spring may drive the stem from the stem receiving portion.

33. A method of assembling a welding gun, comprising the acts of:
   disposing a self-contained trigger and trigger-locking assembly within a first handle piece adapted to receive the self-contained trigger and trigger-locking assembly; and
   securing a second handle piece adapted to receive the self-contained trigger and trigger-locking assembly to the first handle piece to secure the self-contained trigger and trigger-locking assembly to the welding gun.

* * * * *